June 13, 1939.　　R. M. HICKS ET AL　　2,162,170
DECODER
Filed Jan. 2, 1931　　12 Sheets-Sheet 1

INVENTORS
Raymond M. Hicks.
Everett R. Leroy.
BY THEIR ATTORNEYS
Ward, Crosby & Neal June 13, 1939.   R. M. HICKS ET AL   2,162,170
DECODER
Filed Jan. 2, 1931   12 Sheets-Sheet 7

INVENTORS
Raymond M. Hicks.
Everett. R. Leroy.
BY THEIR ATTORNEYS
Ward, Crosby & Neal

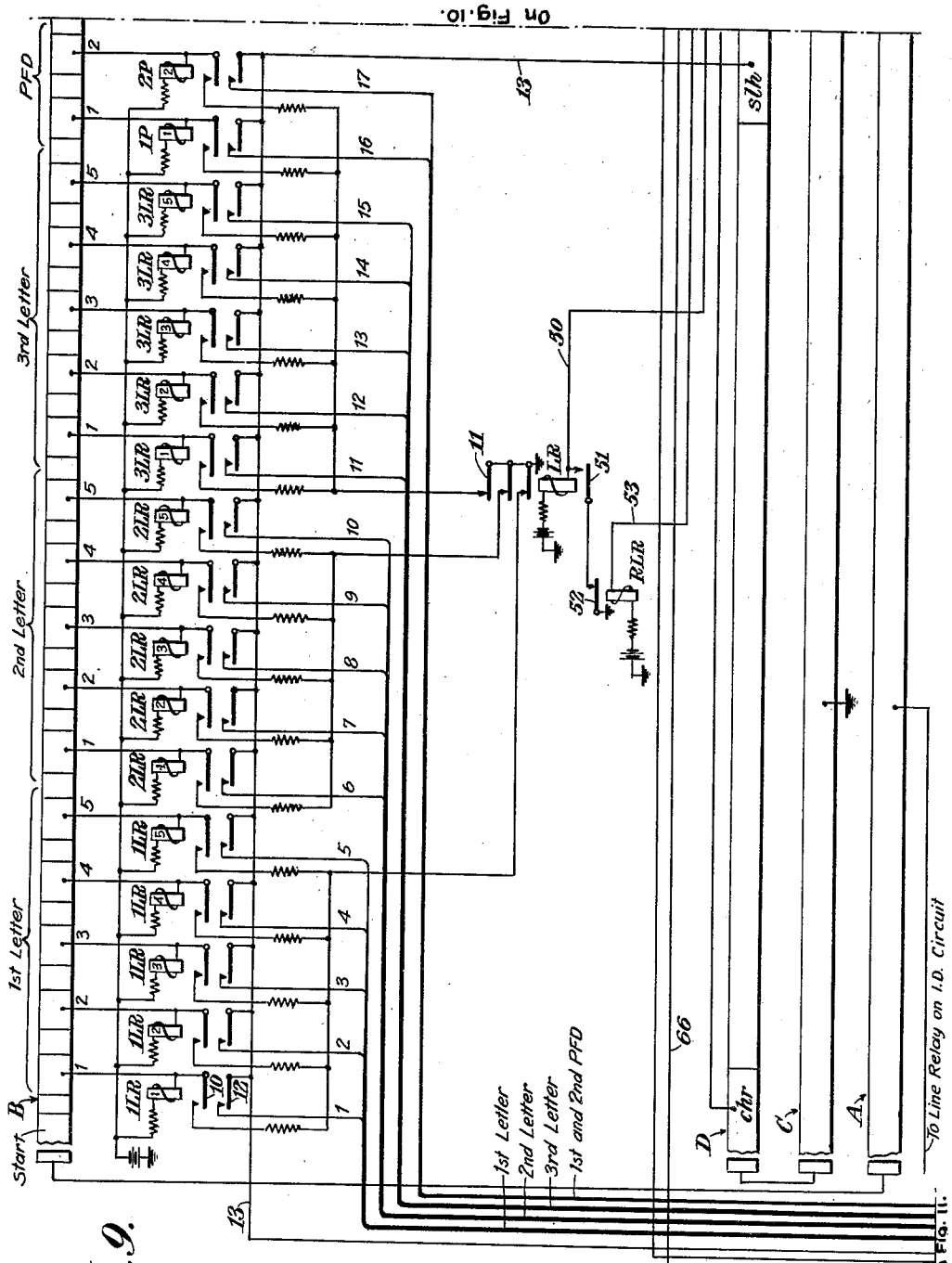

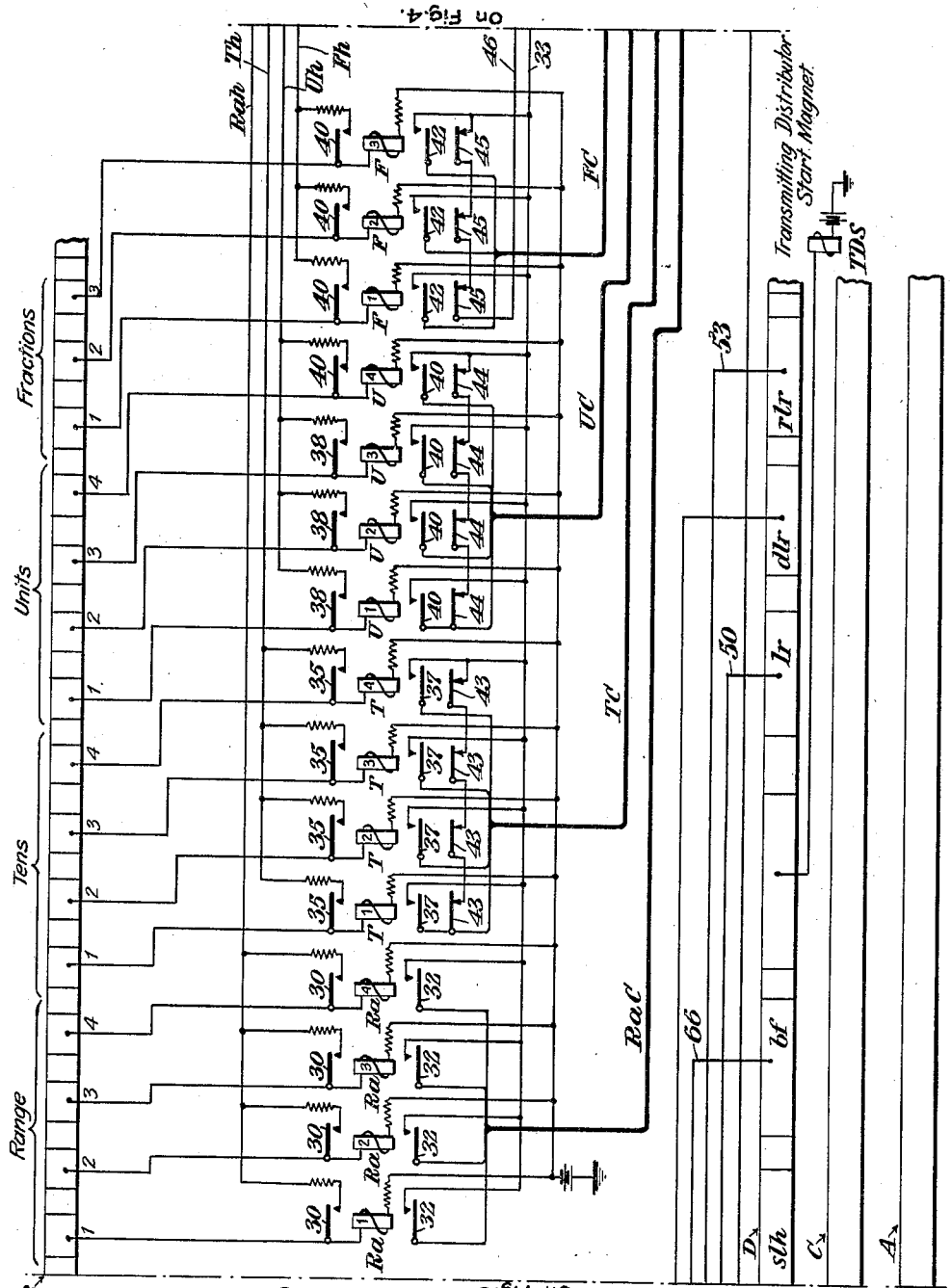

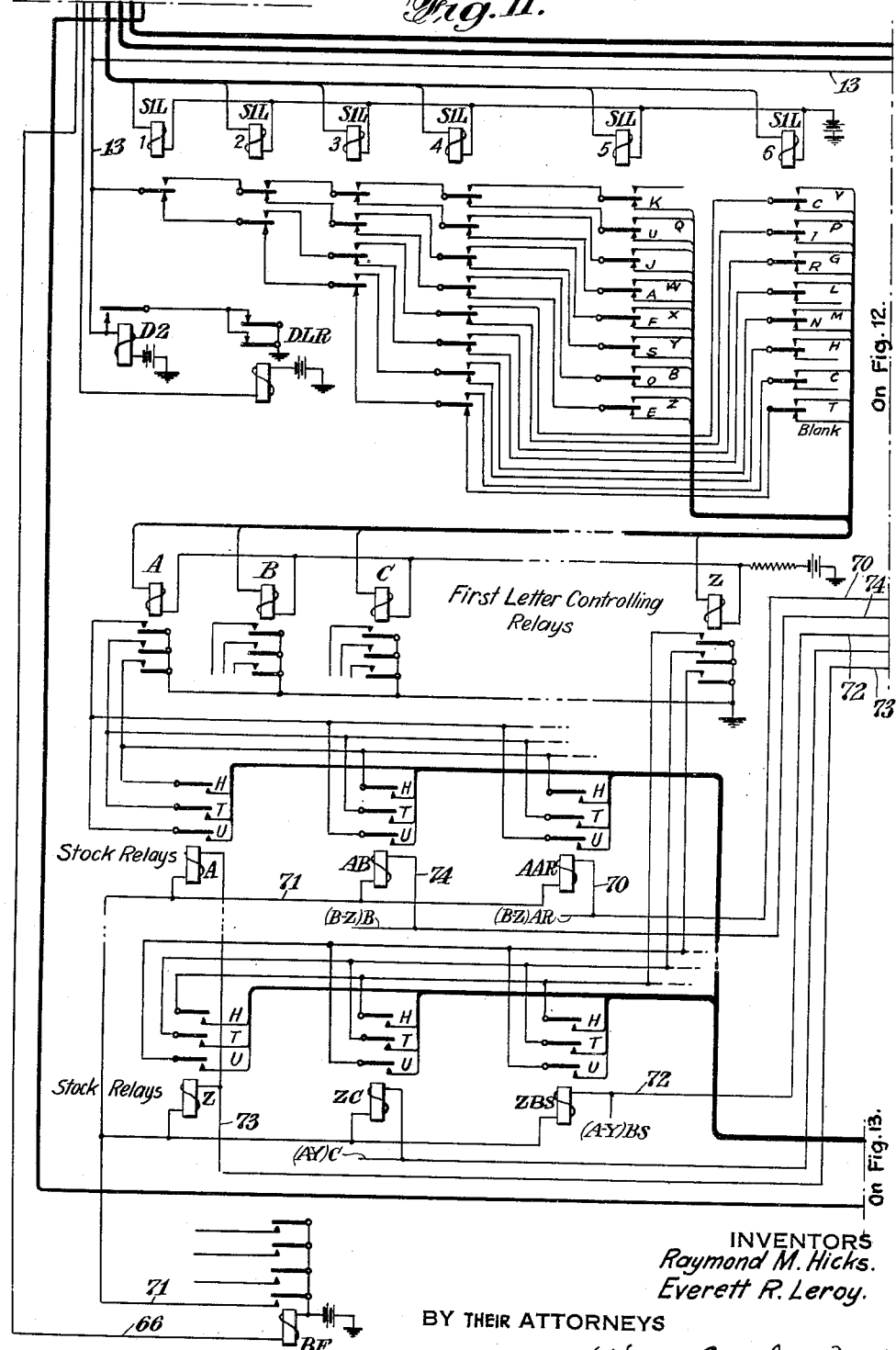

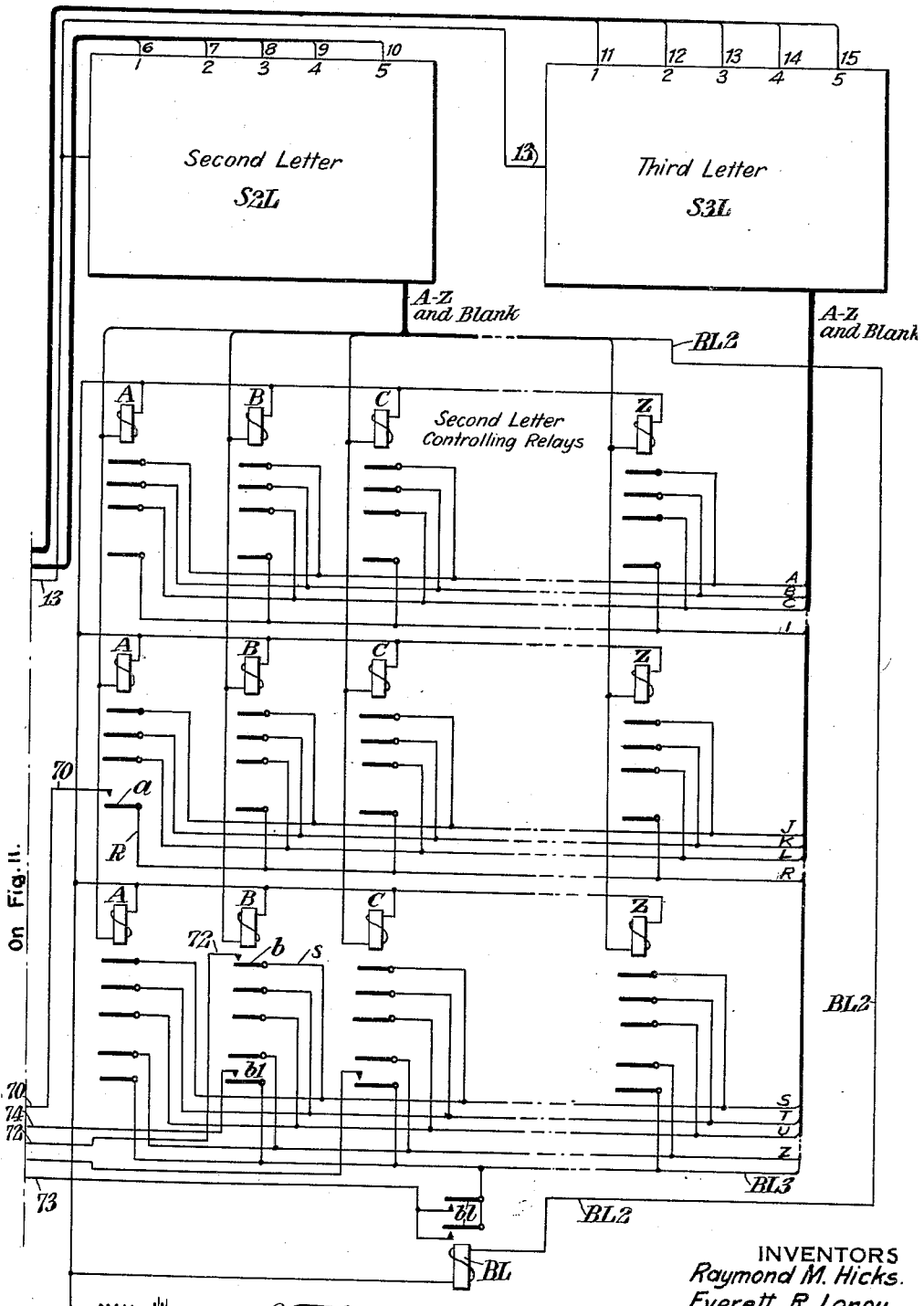

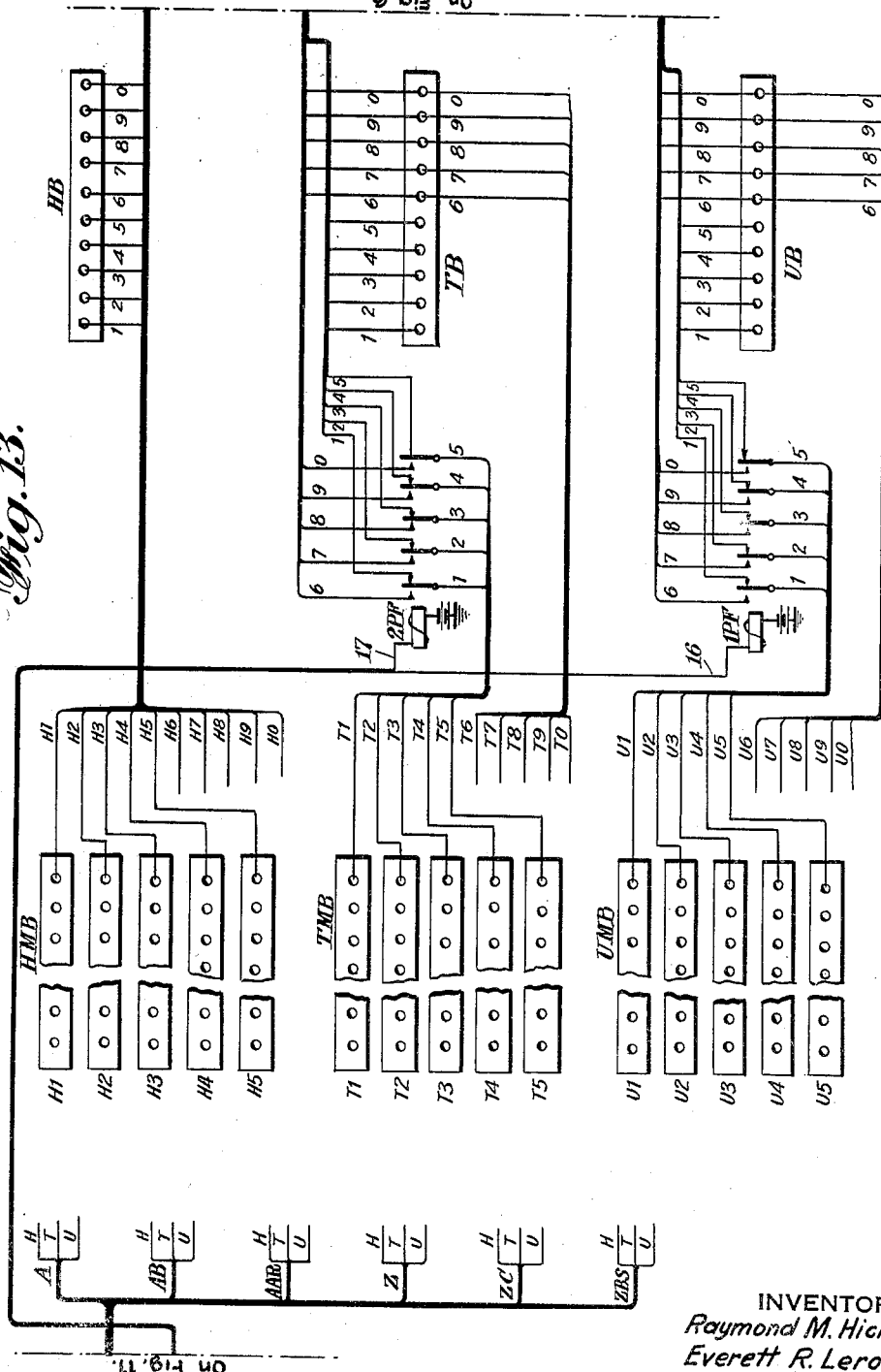

Patented June 13, 1939

2,162,170

UNITED STATES PATENT OFFICE 2,162,170

DECODER

Raymond M. Hicks, Plainfield, N. J., and Everett R. Leroy, New York, N. Y., assignors to The Teleregister Corporation, New York, N. Y., a corporation of Delaware Application January 2, 1931, Serial No. 506,182

11 Claims. (Cl. 177—353)

This invention relates to a decoder for use in connection with the long-distance transmission of items of information such as stock information, and includes mechanism responsive to incoming coded impulses for controlling a resending or retransmitting mechanism to transmit some of the same information under different code to local stations and to transmit coded impulses as to other information in changed time relation.

Among the objects of this invention is the provision of retransmitting mechanism for retransmitting from a central transmitting station to various local receiving stations, information received over a single transmitting wire from a distant primary transmitting station.

Another object is the provision of mechanism in the retransmitting station for decoding and recoding incoming information and transmitting the same to coded pulse receivers and also for retransmitting coded impulses representing information in changed time relation.

Other objects are the provision of mechanical and electrical mechanisms for converting or decoding incoming impulses characterizing stock abbreviations into stock numbers; for decoding and recoding the stock abbreviations under control of stock number relays and for transmitting characterizing coded impulses to coded impulse receivers; providing controls for locking and releasing the various storage relays under control of receiving and retransmitting distributors; providing controls for releasing the retransmitting distributor under control of the receiving distributor; providing channeling mechanism for directing the coded impulses alternately to the sections of the quotation boards in the receiver, and providing such other mechanisms as are essential to the proper operation of a retransmitting mechanism.

Other objects of the invention will be apparent to those skilled in this art after the specific embodiment, illustrated and described for purposes of disclosure, is understood.

With these and other objects in view the invention may consist of mechanism set forth in the following description in connection with the accompanying drawings, in which Fig. 1 shows a schematic arrangement of the receiving, recoding and retransmitting mechanism;

Figs. 2 and 3 taken together show a development in plan of the receiving distributor and control relays controlled thereby;

Figs. 4 and 5 taken together show a development in plan of the resending or retransmitting distributor, the channeling relays and the release controlling relays;

Figs. 9, 10, 11, 12 and 13 show an electrical stock selection mechanism which may be substituted for the mechanical stock selection mechanism in Figs. 1 to 8.

In systems of the character to which this invention relates information relating to various stock, such as the stock name or number, range and the price of the stock are set up on a keyboard in a central station, and as is the practice now are transmitted over a plurality of lines to various indicator boards located in brokers' offices in the city in which the transmitting station is located. This system, including a plurality of line channels usually four in number, could be extended to give the same service to brokers in distant cities. In order to cut down the expense it is our object to transmit all the stock information from one city to a distant city over one line channel and to provide in the distant city a resending or local transmitting central station from which the stock information may be sent out over a plurality of line channels in the same manner that it was sent out from the central station to the brokers' offices in the city in which the main or primary transmitting station is located.

Figure 1:
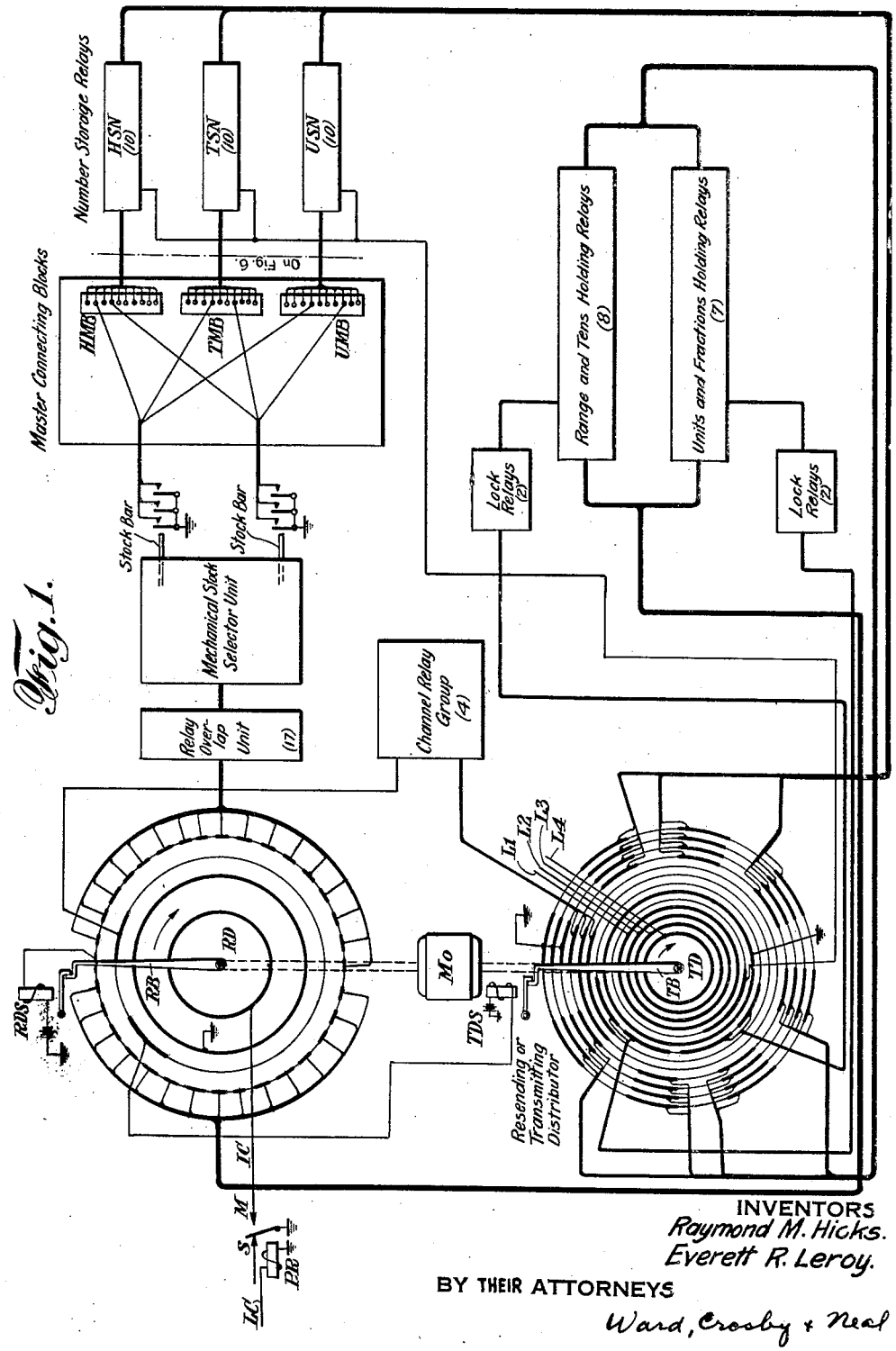

As shown in Fig. 1, the line channel connecting the decoder mechanism to the main transmitting station is indicated at LC which is extended about a coil of the polarized relay PR to ground. In systems now known, the relay PR is normally energized and the information is transmitted by interrupting the circuit energizing this relay. As the relay PR is deenergized it applies ground over its contact to the incoming line IC which transmits resultant impulses across the brush RB of the receiving distributor RD, the first of which impulses completes the circuit over the receiving distributor start magnet RDS which releases the brush RB.

The mechanism also includes a resending or retransmitting distributor TD which is provided with a brush TB the operation of which is controlled by the starting magnet TDS under control of the receiving distributor RD. Both of the distributors RD and TD may be driven from a constantly operating motor Mo through slip clutch connections, not shown, so that the brushes RB and TB will be operated whenever the respective starting magnets RDS and TDS are energized.

All the information relating to a stock, such as the stock letter abbreviations, whether it is first preferred or second preferred, the range, the tens price, the units price, and the fractions price, may be transmitted by a total of thirty-two impulses and spaces over the line LC.

The brush RB of the receiving distributor RD moves across various contacts or segments. It controls a relay overlap unit comprising seventeen relays which in turn control a mechanical stock selection unit which through stock bars control the selective grounding of hundreds, tens, unit stock number relays through the master connecting blocks HMB, TMB and UMB disclosed in this figure.

After the stock abbreviation and preferred information has been received and allocated to the proper relays, the brush RB continues its movement over segments to control the operation of a group of eight holding relays for receiving and storing the information as to the range and the tens price, and subsequently over other segments to control seven holding relays for receiving and storing information as to the units and fractions price.

Shortly after the stock information has been stored the retransmitting distributor starting magnet will be energized and the retransmitting distributor brush TB will be released and through contact with various segments of the retransmitting distributor will control combinations of simultaneous impulses over lines L1, L2, L3 and L4 transmitting the stock number information first by three successive sets of simultaneous impulses, and then the range and the tens, the units and the fractions prices in succession in the same order in which they were received over the receiving distributor RD.

Fig. 1 also shows lock relays for the range and tens holding or storage relays, lock relays for the units and fractions holding or storage relays, and a channeling relay group of four relays. The latter group of relays is used when the quotation board at the brokers' offices is divided into two sections and determines whether the information that is retransmitted is to control one section of the board or the other section, the construction being such, however, as will be described later that information sent out over the lines L1, L2, L3 and L4 will be alternately transmitted to the sections of the board.

Figure 2:
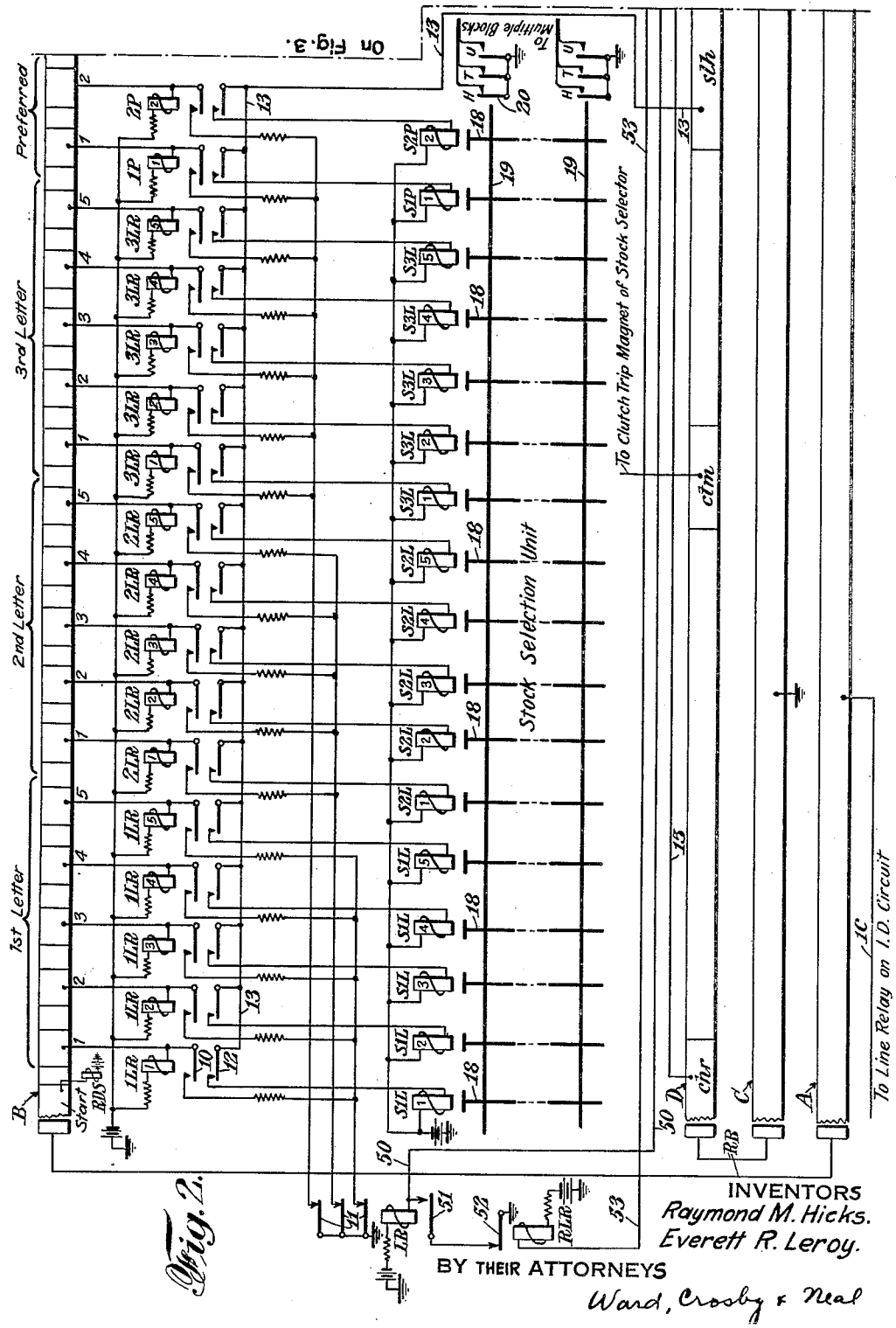
Figure 3:
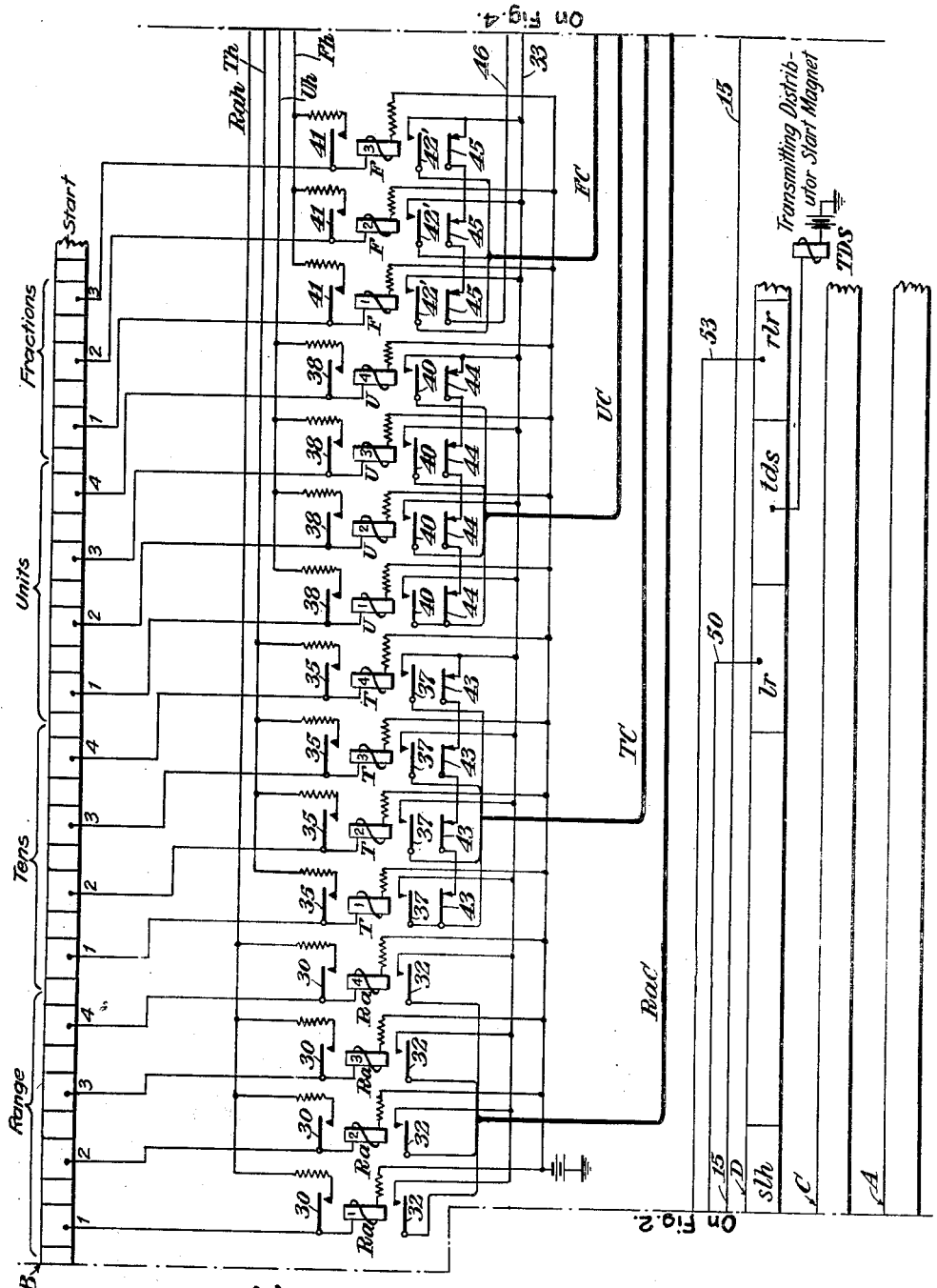

By reference to Figs. 2 and 3, in which the receiving distributor RD is developed in a plane, it will be seen that the distributor comprises rings A, B, C and D, of which the ring A is connected to the incoming line IC and is adapted to be connected by the brush RB to the various segments on the ring B as the brush is operated. The ring C is normally grounded and is adapted to be connected by brush RB to various segments of the ring D for purposes later set forth.

With the parts in the position shown in Figs. 2 and 3, ground applied to the line IC is extended over the start segment of the ring B to the receiving distributor starting magnet RDS, Fig. 1, to release the brush RB for one cycle of operation.

The ring B includes, in addition to the start segment, thirty-two segments, the first five segments being allotted to the first letter of the stock abbreviation, the next five to the second letter, the next five to the third letter, the next two to the first and second preferred stocks, the next four to the range, the next four to the tens, the next four to the units, and the last three to the fractions.

If the brush RB, Fig. 1, is grounded as it is in contact with the segment 1 for the first letter it will complete the circuit for the relay 1LR bearing the numeral "1" causing this relay to be energized. As the relay 1LR is energized it closes a holding circuit over its make contact 10 and a contact 11 of the release relay LR to ground. At its contact 12 relay 1LR prepares a circuit from battery across the coil of selection magnet S1L bearing the numeral "1" to the line 13 connected to a segment slh of the ring D so that the magnet S1L will pick up as the distributor brush makes contact between the ring C and the segment slh of ring D. This, as shown in Fig. 2, occurs after all the stock letter information and preferred information has been stored.

The distributor brush RB continues its movement into contact with the segment 2 for the first letter. If ground is applied to the line IC at this time the corresponding relay 1LR bearing the numeral "2" will pick up and will close a holding circuit for itself and also prepare a circuit for the corresponding selection magnet S1L bearing the numeral "2" in the same manner in which the relay 1LR bearing the numeral "1" operated over the segment 1.

The distributor brush continues its movements over segment 3 and the corresponding relay 1LR will pick up to close a holding circuit for itself and prepare a circuit for the corresponding selection magnet S1L, if ground is applied to the line IC at this time. If no ground is applied to the line IC then the relay 1LR corresponding to segment 3 will remain deenergized.

From what has been stated it will be seen that the various relays corresponding to the segments 1 to 5 over which the first letter information is received will be energized in various combinations, depending upon the interruptions of the current on the line LC, Fig. 1, to represent the first letter of the stock abbreviation. These relays will lock over a contact 11 of the relay LR and prepare circuits for the corresponding magnets S1L to the segment slh so that these magnets will pick up at the time the brush connects ground on the ring C to the segment slh on ring D.

Coded information as to the first letter of the stock abbreviation has now been stored in the first five relays 1LR. The brush RB continues its movement across the five segments for the second letter of the stock abbreviation and causes energization of certain of the relays 2LR which prepare circuits over the line 13 to the segment slh for the corresponding selection magnets S2L, the relays 2LR locking over a contact 11 of relay LR.

As the brush RB moves over the five segments, over which the information concerning the third letter of the stock abbreviation is received, various relays 3LR will pick up and lock over a contact 11 of the relay LR and prepare circuits for the corresponding selection magnets S3L over the line 13 to the segment slh of the ring D.

By means of the mechanism so far described information as to a three letter common stock abbreviation has been stored in the relays 1LR, 2LR and 3LR.

If the price to be set up relates to the first or second preferred of the three letter stock setup, the brush RB, as it moves over the segments 1 and 2 under preferred PFD, will complete a circuit over the coils of relay IP or relay 2P as the case may be, which relay picks up and locks over a contact II of the relay LR and prepares a circuit for the selection magnet SIP or S2P over the line 13 to the segment *slh* of ring D.

All the information as to the stock designation, that is, the stock abbreviation and whether it is first preferred or second preferred, has now been stored in the relays ILR, 2LR, 3LR, IP and 2P shown in Fig. 2 and will be transferred into the selection magnets SIL, S2L, S3L, SIP and S2P as soon as the brush connects the segments *slh* to the ring C which completes the circuits of these magnets.

The brush RB in its home position connects the grounded ring C to a segment *chr* of the ring D which is connected by line 15 across Figs. 2, 3 and 4 to the channeling relays CI, C2, C3 and C4 to control their operation as will be set forth later.

As the brush continues its operation it connects the ring C to a segment *ctm* of the ring D which energizes a clutch trip magnet, not shown, controlling the operation of a stock selection unit indicated diagrammatically and including the selection magnets. The stock selection equipment has for its essential features a set of notched code bars 18 similar to those used in certain of the well-known Teletype printers. Seventeen of these bars, arranged in three sets of five each and one set of two, are arranged to take settings under control of the selection magnets corresponding to line impulses received for a stock abbreviation and also whether the first or second preferred stock is to be quoted. Each stock abbreviation sent out usually comprises three characters, dashes being sent out for the missing letters in the case of stocks having one and two letter abbreviations. Each character consists of a five unit code and the seventeen code impulses or spaces thus received determine the setting of the seventeen code bars.

Located transversely to and above the seventeen code bars are any desired number of stock bars 19, there being preferably one hundred stock bars, for each unit of the equipment, there being as many units as are required for the number of stocks to be posted. Each of the stock bars is so notched with respect to the seventeen code bars that one, and only one, setting of the code bars will permit it to move parallel to its length under control of the usual coil spring. Thus, for every possible setting of the code bars as determined by the line impulses for a stock abbreviation and whether it is first or second preferred there is one corresponding stock bar which will move after the stock abbreviation and the preferred information has been received and the code bars set. In moving, the stock bar closes three contacts which apply ground to lines which extend to master connection blocks wherein all the lines corresponding to the same digits of the hundreds, tens and units stock numbers are connected to the ground lines and the corresponding digit or number relays in the hundreds, tens, units stock number groups of stock number relays.

Figure 6:
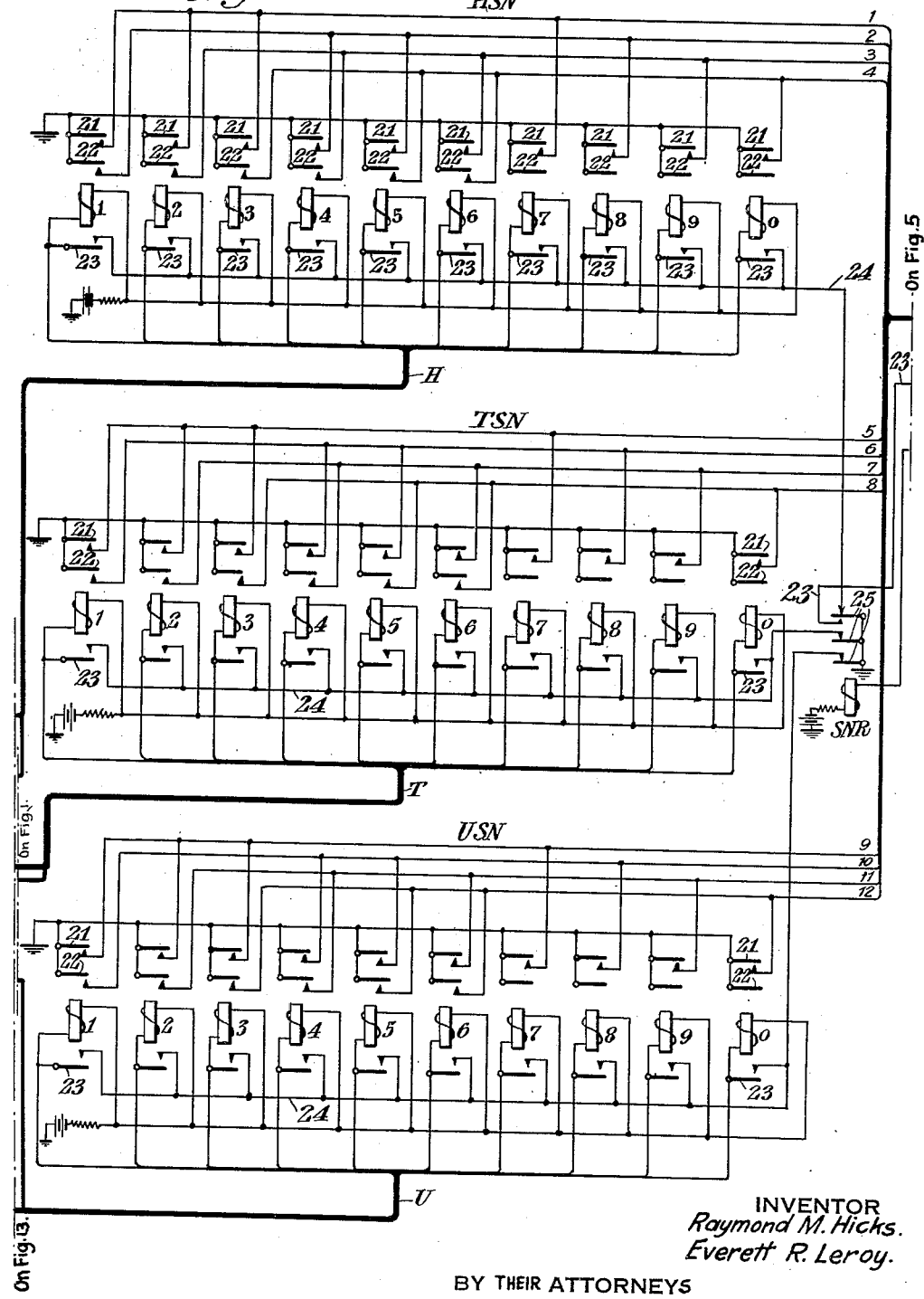
Fig. 6 shows the stock number relays.
Figure 7:
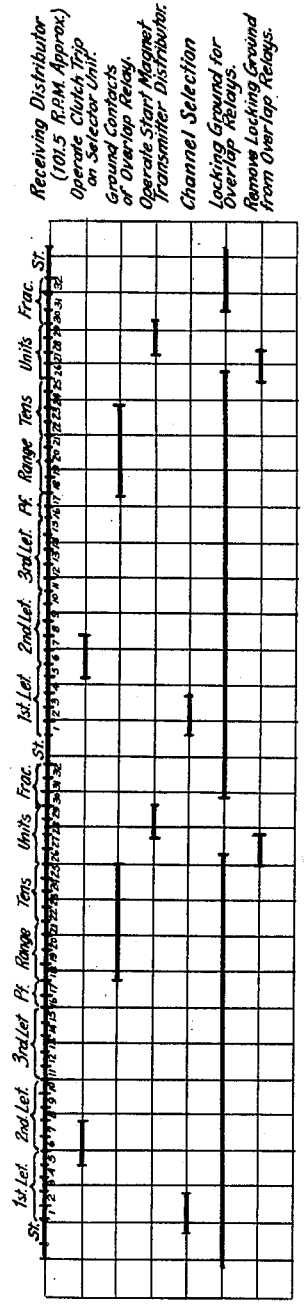
Fig. 7 shows a functional time chart of the receiving distributor.
Figure 8:
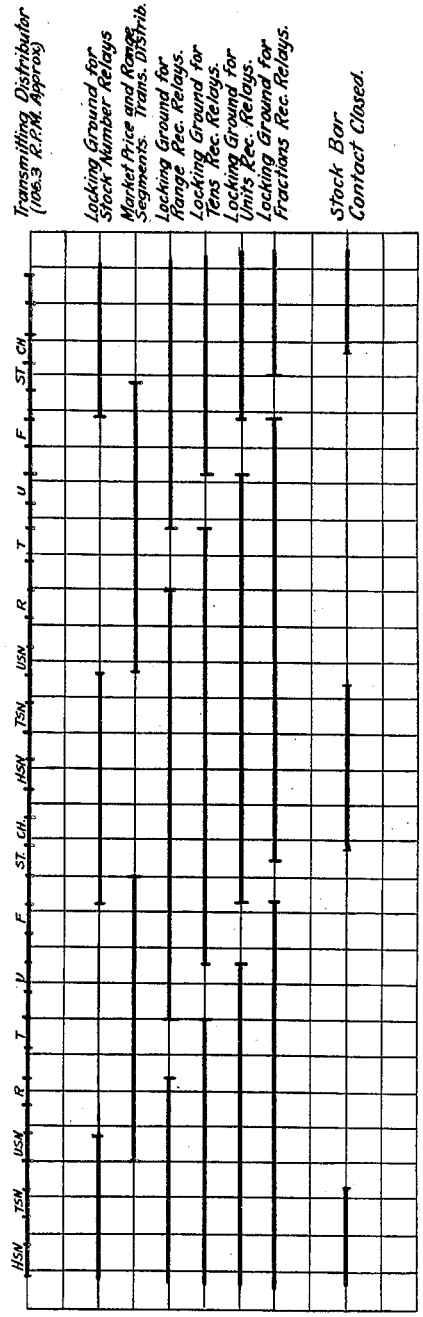
Fig. 8 shows a functional time chart of the resending or retransmitting distributor.

As the brush RB continues its movement it connects the ring C to the segments *slh* of the ring D to which the line 13, which is the ground line for the various selection magnets, is connected. As indicated in Fig. 2, the circuit for these magnets is completed at the time the storing of the stock letter and preferred information has been completed. After these magnets have picked up and have operated their code bars 18 the stock bars 19 will move to the right, Fig. 2, and apply ground over contacts 20 to lines H, T and U, which, as shown in Fig. 1, are connected across master connecting blocks HMB, TMB and UMB to groups of stock number storage relays HSN, TSN and USN, detailed in Fig. 6. As shown in Fig. 6, battery is applied to one side of the coils of the stock number relays of each of these groups so that a relay in each of these groups will pick up as a stock bar 19 applies ground to the lines H, T and U. By means of this mechanism the stock abbreviation has been converted into a number represented by the energized relays in Fig. 6.

Figure 4:
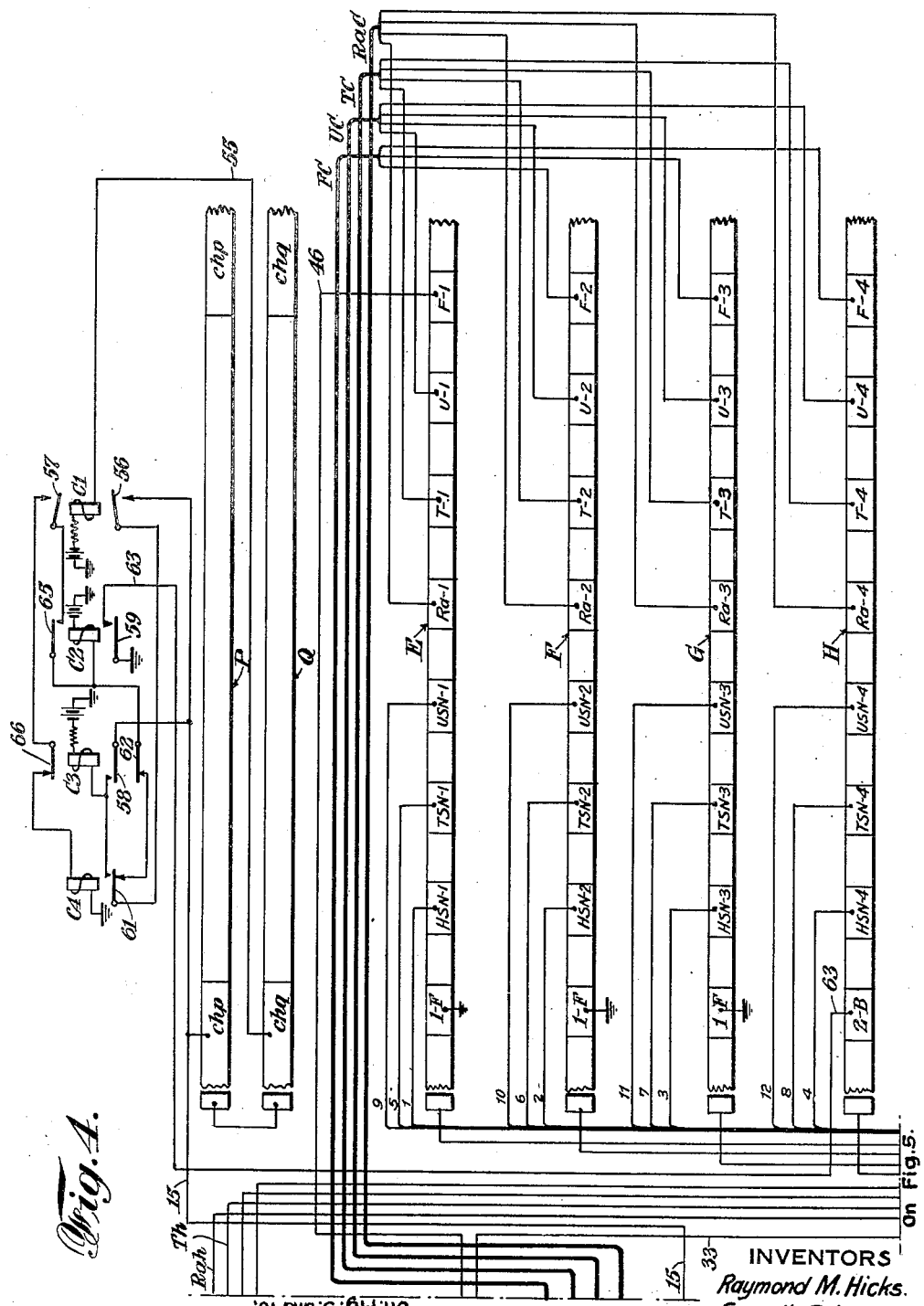

As a relay HSN in Fig. 6 corresponding to the hundreds stock number picks up it connects ground across its contacts 21, 22, to certain of the lines with which the numerals 1, 2, 3 and 4 are associated which, as shown in Fig. 4, are connected respectively to hundreds segments HSN—1, HSN—2, HSN—3 and HSN—4 of the rings E, F, G and H of the resending or retransmitting distributor TD, Fig. 1, to transmit impulses across corresponding segments as the transmitting distributor TD is operated. This relay also locks over its make contact 23 and line 24 and a break contact 25 of the stock number release relay SNR to ground.

As a relay in the TSN group picks up it applies ground to certain of the lines with which the numerals 5, 6, 7 and 8 are associated, which lines are connected to the tens segments TSN—1, TSN—2, TSN—3 and TSN—4 of the rings E, F, G and H. This relay also closes a holding circuit for itself over its contact 23 and line 24 and a contact 25 of the relay SNR to ground.

The relay energized in the USN group applies ground to certain of the lines 9, 10, 11 and 12 which, as shown in Fig. 4, are connected to the units segments USN—1, USN—2, USN—3 and USN—4 of the rings E, F, G and H. This relay also over its contact 23 closes a holding circuit to the line 24 grounded over a contact 25 of the relay SNR.

By means of a mechanism so far described under control of the series of impulses representing the first, second and third letters of a stock and the first and preferred of the stock, ground has been applied to the stock number segments HSN, TSN, USN of the rings E, F, G and H, Fig. 4, which is now available for resending or retransmitting to local stations in the city in which this mechanism is located.

After the stock information has been received the distributor brush RB, Fig. 1, continues its movement across the range, tens, units and fractions segments, Fig. 3. If ground is applied to the line IC, Fig. 2, as the brush RB makes contact with segment I of the range segments it completes the energizing circuit from battery for the relay R*a*, I. As this relay picks up it closes a holding circuit for itself over its contact 30 to the line R*ah* which, as shown, is continued across Fig. 4 to Fig. 5 where it is grounded over the break contacts 31 of the range release relay R*a*R. The relay R*a*, I, at its contact 32 prepares a circuit from a contact 25 of the stock number release relay SNR, Fig. 6, over line 33, Fig. 5; line 33, Fig. 4; line 33, Fig. 3; and one of the lines of the cable R*a*C which in Fig. 4 is connected to the segment R*a*—I of ring E.

If ground is not applied over the range segment I but over the range segment 2 then a circuit similar to that just described will be made to the segment R*a*—2 of the ring F. Similarly, a circuit such as described may be made to the segment R*a*—3 of the ring G, or the segment R*a*—4 of the ring H depending upon whether ground is applied across the segment 3 or the segment 4. Ground may be applied to these segments in various combinations for effecting selection of various ranges or combinations of ranges.

Figure 5:
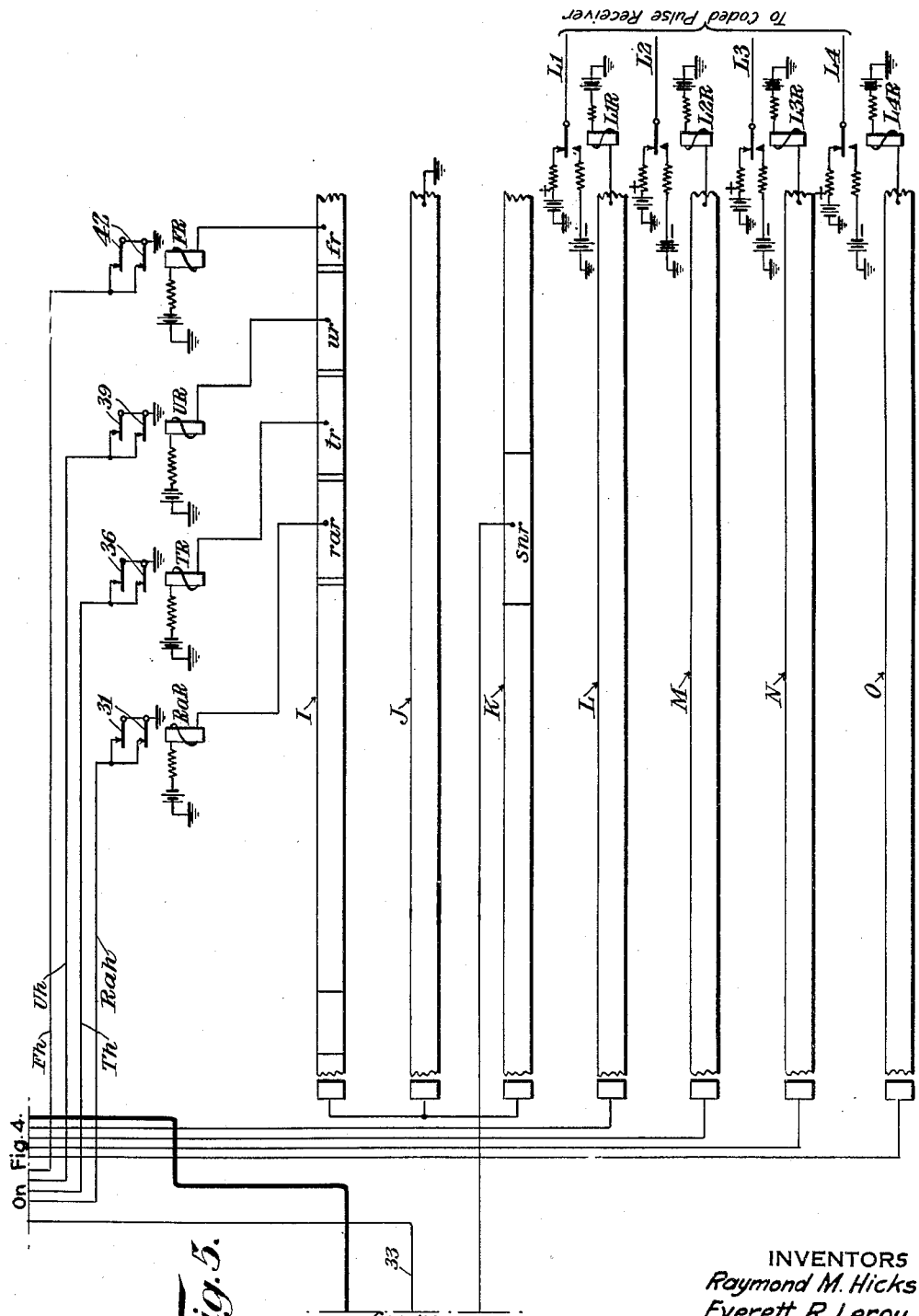

As the brush RB continues on to the tens segments 1 to 4 it will energize one or more of the relays T which will lock over their contacts 35 to a line T*h* which is normally grounded across contacts 36 of relay TR, Fig. 5. These relays T also connect the line 33 over their contacts 37 to their respective lines in the cable TC which lines are connected to the tens segments T—1, T—2, T—3 and T—4 of the rings E, F, G and H, Fig. 4.

As the brush RB moves across the units segments it will energize the relays U in various combinations which establish holding circuits for themselves over their contacts 38 and line U*h* and contacts 39 of relay UR, Fig. 5, to ground. These relays also at their contacts 40 connect the line 33 to their respective lines in the cable UC which lines, as shown in Fig. 4, are connected to the segments U—1, U—2, U—3 and U—4 of the rings E, F, G and H.

As the brush RB moves into engagement with the fractions segments it will cause the energization of the relays F in various combinations which will lock over contacts 41 to the line F*h* which is grounded over the contacts 42 of relay FR, Fig. 5. These relays also connect line 33 over their contacts 42' to respective lines in the cable FC which lines, as shown in Fig. 4, are connected to the segments F—2, F—3 and F—4 of the rings F, G and H.

If the brush RB as it moves over the tens segments is not grounded then the line 33 will remain connected over the contacts 43 of the relays T to the line in the cable TC which is controlled by the relay T controlled over tens segment 1. This line is connected to the segment T—1 on the ring E in Fig. 4. This is for the purpose of controlling the transmission of an impulse indicating that no tens price is to be displayed.

If, as the brush RB moves over the units segments, it is not grounded over these segments then the circuit from the line 33 over the contacts 44 of the relays U will remain connected to a line in the cable UC which is controlled by the relay U controlled over unit segment 1. This line is connected to the segment U—1 of the ring E, Fig. 4. The purpose of this is to transmit an impulse to indicate that no units price is to be displayed.

If there is no change in the fractions price then none of the relays F will be energized and the line 33 will remain connected over the contacts 45 of the relays F to a line 46 which, as shown in Fig. 6, is connected to the fractions segment F—1 of the ring E. The purpose of this is to send an impulse indicative of the fact that no fractions price is to be displayed.

The resending or retransmitting distributor TD includes, in addition to the segmental rings E, F, G and H, cooperating continuous rings L, M, N and O connected to the ground lines of relays L1R, L2R, L3R and L4R so that when the brush TB moves into engagement with grounded segments of the rings E, F, G and H corresponding relays L1R, L2R, L3R and L4R will be energized and through their contacts will remove positive battery and apply negative battery respectively to the lines L1, L2, L3 and L4 which extend to a coded pulse receiver to control the selection and operation of indicators on a quotation board.

The transmitting distributor, in addition, includes rings I, J and K of which J is permanently grounded and is adapted to be connected by the brush TB to the rings I and K.

As the brush connects the ring J to the segment *snr* of the ring K it completes a circuit for the stock number release relay SNR, Fig. 6, which at its contacts 25 opens the holding circuits for the stock number relays HSN, TSN and USN. At the same time one of the contacts 25 of relay SNR applies ground to the line 33 which applies ground to various of the lines of cables RaC, TC, UC and FC which are the lines connected to the various segments R*a*—(1 to 4), T—(1 to 4), U—(1 to 4) and F—(1 to 4) of the rings E, F, G and H, as before described.

The ring I is provided with segments *rar, tr, ur* and *fr* which are connected to the ground leads of the relays RaR, TR, UR and FR, Fig. 5, so that the brush TB as it grounds these various segments causes these relays to be energized. As the relays pick up they operate their contacts 31, 36, 39 and 42 and remove ground respectively from the lines R*ah*, T*h*, U*h*, F*h* which are the holding ground lines for the various range, tens, units and fractions relays, Fig. 3, causing these relays to release.

The transmitting distributor also includes rings P and Q which cooperate in controlling the channeling relays C1, C2, C3 and C4, Fig. 4, which will be referred to later, as these relays are only necessary in case the quotation board is divided into sections.

The function of the rings C and D of the receiving distributor, Figs. 1 and 2, has been described as to the segments *ctm, slh*, the segment *slh* as will be remembered having caused the magnets S1L, S2L, S3L, S1P and S2P to pick up.

As the brush RB of the receiving distributor RD continues its movement it connects the ring C to the segment *lr* of the ring D which is connected by a line 50 to one terminal of the relay LR, Fig. 2, causing this relay to pick up and to open at its contacts 11 the holding circuits of the relays 1LR, 2LR, 3LR, 1P and 2P, Fig. 2, so that these relays will be released.

As the brush RB leaves the segment *slh* it removes ground from the holding circuits for the magnets S1L, S2L, S3L, S1P and S2P causing these magnets to descend.

As the brush RB leaves the segment *lr* it opens the circuit of the relay LR at this point. The relay LR, however, remains closed over the holding circuit made over its contact 51 and a contact 52 of relay RLR to ground.

As the brush RB continues its movement it comes into contact with the segment *tds* which is connected to the ground line of the retransmitting distributor starting magnet TDS. As this magnet picks up it releases the retransmitting distributor brush TB, Fig. 1, permitting this brush to be moved by the motor in the same manner as the brush RB of the distributor RD was permitted to move upon energization of the starting magnet RDS. This permits the brush TB to move over the contact rings of the transmitting distributor shown in Fig. 4.

As the brush RB of the receiving distributor continues its movement it connects the ring C to a segment *rlr* which is connected by a line 53 to the ground terminal of the relay RLR, Fig. 2, causing this relay to pick up. As this relay picks up it opens the circuit of the relay LR at its contact 52. As the relay LR descends it applies ground to the holding circuits for the letter and preferred relays in Fig. 2. The letter and preferred relays are now in condition to receive letter and preferred information as to another stock.

Channeling relays

It is assumed that the brushes RB and TB are in the home position, as indicated in Figs. 1, 2, 3, 4 and 5. In this position of the brushes ground is applied from the ring C of the receiving distributor across the brush RB to a channeling relay controlling segment *chr* of ring D which continues on the line 15 before referred to, and across the segment *chp* of the ring P, Fig. 4, of the retransmitting distributor, across the brush TB to the segment *chq* of the ring Q, to a line 55 which is the ground terminal of the relay C1. This relay is picked up and has opened its contacts 56 and 57. The ground on the line 15 is interrupted at the contact 56 and also at the contact 58 of relay C3. In this position of the distributors the relay C1 is energized and the relay C2 is deenergized with its contact 59 open removing ground from the line 63 which is connected to channeling segment *chan* 2—B of the ring H of the transmitting distributor. The channel segments 1—F of rings E, F and G are permanently grounded. When the distributor arm TB moves over the segments it extends the ground on segments *chan* 1—F to the rings L, M and N which causes the relays L1R, L2R and L3R to pick up and to send negative impulses over the lines L1, L2 and L3 which by mechanism not herein disclosed connects the lines L1, L2, L3 and L4 to mechanism which controls one section of the stock quotation board so that the subsequent impulses over the lines L1, L2, L3 and L4 under control of the various relays energized will cause the control and operation of such section of the stock quotation board. The first impulse over the incoming line IC releases the brush RB which moves off the segment *chr* and opens the circuit of the relay C1 causing the contacts 56 and 57 to close. After these contacts close, the receiving distributor brush RB continues its movement over the segment *tds* and releases the transmitting distributor arm TB which moves off from the segments *chp* and *chq* thus preventing energization of the relay C1 as the brush RB again applies ground to the line 15. When the brush RB again applies ground to line 15, this ground will be extended over contact 56 of relay C1 and a make and break contact 61 of relay C4 and a break contact 62 of relay C3 to the ground line of the relay C2 causing this relay to pick up. As the relay C2 picks up it applies ground at its contact 59 to a line 63 which is connected to the channel segment 2—B of the ring H. During the next operation of the brush TB the ground over the contact 59 and the line 63 will be continued across the channel segment 2—B of the ring H to the ring O causing the relay L4R to pick up in addition to relays L1R, L2R and L3R. These relays send negative impulses over the lines L1, L2, L3 and L4 which by mechanism not herein described causes the lines L1, L2, L3 and L4 to be connected to the other section of the board so that subsequent impulses will control the operation of this section of the board.

As the relay C2 picks up it closes a circuit over its contact 65, the contact 57 of the relay C1 which is now deenergized, and the contact 66 of relay C3 to the ground terminal of the relay C4. As the relay C4 picks up it operates the make and break contact 61 opening the circuit for the relay C2 at one point and preparing a circuit to line 15 for the relay C3 which when the brush RB again grounds line 15 picks up and opens the circuit for the relay C2 at another point which descends and removes ground from line 63 connected to segment 2—B. The relay C4 also descends. The relay C3 closes a circuit for itself over its contact 58 to the line 15 and remains energized as long as brush RB is on segment *chr*. This relay will descend as soon as the brush RB leaves the segment *chr* of the ring D, Fig. 2, and close the initial and holding circuits of relay C2 at contacts 62 and 66. At this time all the relays in Fig. 4 are down and when the brush RB again grounds the line 15, the relay C2 will be energized and will apply ground to line 63. The condition shown in Fig. 4 in which the relay C1 is up will again occur whenever the brushes RB and TB are in engagement with the segments *chr* and *chp* and *chq* at the end of a series of operations. When the mechanism is started the channel segments 1—F are grounded which control the receivers to operate the same section first.

Electrical stock selection mechanism

Of the modification shown in Figs. 9 to 13, Fig. 10 may be substituted for Fig. 3 in the modification in Figs. 1 to 8; and Figs. 9, 11, 12 and 13 may be substituted for Fig. 2, and the master connecting blocks in Fig. 1. The ring D of the receiving distributor RD is modified as shown in Figs. 9 and 10.

The distributor arm RB, Fig. 1, is caused to move over the various distributor rings A, B, C and D and as it moves over the ring B it causes the relays 1LR, 2LR, 3LR, 1P, 2P, Ra, T, U and F to pick up, the latter relays Ra, T, U and F preparing circuits and controlling mechanisms exactly the same as in the modification shown in Figs. 1 to 8. The letter and preferred relays in Fig. 9 operate their contacts 10 to lock over the contacts 11 of the relay LR as before which relay LR is adapted to be energized to release the holding circuits for the letter and preferred relays by a circuit over line 50 and contact *lr* as in the first modification. As this relay picks up it locks over its contact 51 and the contact 52 of relay RLR to ground, the relay RLR being energized at the proper time by a circuit over line 53 and segment *rlr* of ring D to break the circuit for the relay LR to reapply ground to the holding line for the letter relays over the contacts 11 as in the first modification.

As the relays 1LR, 2LR, 3LR, 1P and 2P pick up they prepare, as before, circuits over their contacts 12 from the line 13 to lines with which the numerals 1 to 17 are associated which are the ground lines for the letter selecting and preferred stock relays, the letter selecting relays for the first letter being detailed out and designated S1L, in Fig. 11, the relays for the second and third letters being not disclosed but merely indicated by rectangles and designations S2L and S3L, and the first and second preferred stock relays being indicated by 1PF and 2PF, Fig. 13.

As the distributor arm RB engages the segment *slh* of ring D, Fig. 9, it connects the line 13 to the grounded ring C. The ground on line 13 is extended over the contacts 12 of the letter and preferred relays and lines 1 to 17 in Fig. 9 to Figs. 11, 12 and 13 to ground the corresponding letter selecting and preferred stock relays causing these relays to pick up. As the letter selecting relays S1L for the first letter pick up they extend ground from the line 13 across their various contacts, as indicated in Fig. 11, to lines with which the letters of the alphabet are associated and to a blank line which will be referred to later and which has no special function in connection with the first letter relays. These lines are connected to first letter controlling relays A to Z one of which will pick up and connect ground over its contacts to lines which are parallel to the contacts of all the stock relays A, AB, AAR, etc., corresponding to stocks having the single letter A or two letter stocks having the first letter A or three letter stocks having the first letter A. This same construction is also indicated in connection with the first letter controlling relay Z and the stock relays Z, ZC and ZBS, etc.

As ground is applied to line 13 selecting relays S2L in the second letter selecting group and selecting relays S3L in the third letter selecting group represented by the rectangles in Fig. 12, that is, the relays corresponding to the energized relays 2LR and 3LR, Fig. 9, if such relays have been energized, pick up and connect the line 13 across their various contacts to lines with which the letters of the alphabet are associated. The ground across the second letter selecting relays S2L is extended to the ground terminal of the corresponding second letter controlling relays A to Z, Fig. 12, to the other terminal of which battery is normally applied, which pick up and over their contacts connect the grounded lines of the third letter selecting relays S3L which are the ground lines for the three letter stock relays corresponding to the first and second letter controlling relays and the third letter selecting relays energized and for all stock relays having the same second and third letters. As shown in the drawings, if the first letter controlling relay A, Fig. 11, is energized it will extend ground to the contacts of all the stock relays beginning with the letter A. The second letter controlling relay A at its contact $a$ connects the line R grounded over the third letter selection relays S3L to the ground line 70 of the stock relay AAR, Fig. 11, and all stock relays having the same second and third letters, causing these relays to pick up after battery is applied across the contacts of relay BF to line 71, and to extend the ground applied by the first letter controlling relay A to the lines H, T, U which are the lines that are connected to the connection blocks in Fig. 13 and with which the letters AAR are associated. These lines H, T, U may be connected across the master connection blocks HMB, TMB and UMB, Figs. 1 and 13, to the hundreds, tens and units blocks HB, TB and UB, Fig. 13, which in turn are connected to the ground terminals of the stock number relays in Fig. 6. This causes corresponding stock number relays to pick up and to cause the transmission of positive and negative impulses upon operation of the retransmitting distributor as in the first modification.

If the stock to be selected is a stock ZBS then the first letter controlling relay Z in Fig. 11 will apply ground to all the Z relays, such as indicated by Z, ZC, ZBS, etc. in Fig. 11, and this ground will be extended across the contacts of the relay ZBS to the lines H, T and U as the relay ZBS is energized from the S line grounded over the third letter selection relays and extending ground across a contact $b$ of the relay B of the second letter controlling relays and line 72 to the ground line of relay ZBS and relays (A to Y) BS.

The construction of the second and third letter selection relays S2L and S3L, Fig. 12, is the same as that of the first letter selection relays detailed out in Fig. 11 except that the line indicated by blank is made use of in the second and third letter selection relays. As indicated in Fig. 11 the blank line is normally connected across the contacts of all of the relays S1L to the line 13. If there is no second or third letter in the stock abbreviation then ground on the line 13 will be continued across the third letter relays S3L to the blank line BL3, Fig. 12, which after operation of the relay BL operated from the blank line BL2 across the contacts of the second letter selecting relays S2L will be extended across the contacts $bl$ of relay BL and line 73 to the ground terminals of the single letter stock relays A to Z, Fig. 11, so that these relays will pick up after battery has been applied to these relays across the contact of relay BF.

If the stock is designated by two letters then the line BL3 will be connected across one of the operated second letter relays, Fig. 12, and if the particular two letter stock is designated by AB then ground on the letter BL3 will be extended across a contact $bl$ of the second letter controlling relay B, Fig. 12, to the ground line 74 of the stock relay AB, and (B to Z) B Fig. 11, causing these relays to pick up after the relay BF has picked up, and to connect the lines grounded over the first letter controlling relay A to lines H, T, U indicating the stock number corresponding to the stock AB.

Immediately after ground has been completed to the line 13, ground will be applied from ring C over segment $bf$ of ring D and line 66 to the terminal of the relay BF, Fig. 11, which applies battery across its contacts to the energizing lines 71 of all the stock relays. This circuit is completed over the coil of a particular one of the stock relays across the contacts of the various relays in Fig. 12 to the line 13 which is grounded over the contact of the relay D2 which was energized as ground was applied to the line 13 over the segment $slh$. The relay D2 is held over its own contact and across contacts of relay DLR to ground.

As the stock relay picks up it grounds the lines H, T, U which causes the corresponding stock number relays in Fig. 6 to pick up and to lock, as before. As the receiving distributor RB leaves the segment $bf$, the initial circuit for the relay BF, Fig. 11, will be broken, but the stock number relays will be held over line 24 and contacts 25 of relay SNR, Fig. 6, as before. As the receiving distributor brush continues its movement it engages the segment $tds$ to close the circuit for the starting magnet TDS to set the transmitting distributor in operation.

Upon further movement of the brush RB it applies ground to the segment $rl$ which over line 50 energizes the relay LR, Fig. 9, releasing the relays 1LR, 2LR, 3LR, 1P and 2P, as before.

As the brush continues its movement it grounds the segment $dlr$ which causes the relay DLR, Fig. 11, to pick up and to remove ground from the circuit of the relay D2 and the line 13, thus causing the stock letter controlling relays for the first and second letter to release.

As the receiving distributor brush RB continues its movement it grounds the segment $rlr$ which over line 53 causes the relay RLR, Fig. 9, to pick up and to open the holding circuit of the relay LR which upon release applies ground over its contacts 11 to the holding circuits of the relays 1LR, 2LR, 3LR, 1P and 2P, Fig. 9. The mechanism shown in Figs. 9 to 13 is now in condition to receive stock and preferred information as to another stock.

*Preferred stock selecting mechanism*

In selecting the first or second preferred stock of a stock the letters designating the common stock are set up as before applying ground to the various lines H, T, U, Fig. 13, on which the digit line corresponding to the digits 1 to 5 in the units position are connected across the contacts of the 1PF relay to increase the numerical value of the lines by five, after which they extend to the units stock number relays on Fig. 6 so that if the common stock number is 321 the first preferred stock number will be 326.

If there is a second preferred stock then the digit lines 1 to 5 of the tens common stock number will be connected across contacts of the relay 2PF to lines 6 to 9 respectively so that if the common stock number is 321 the second preferred stock number will be 371 and the relays in Fig. 6 corresponding to this stock number will pick up.

While the invention has been described with certain particularity as to one preferred embodiment of a combination of mechanisms and two embodiments of an element thereof, it is to be understood that this has been done for purposes of illustration and that various changes and substitutions may readily be apparent to those skilled in the art after understanding the invention herein disclosed. The words employed in the claims are therefore words of description and not of limitation.

What is claimed is:

1. In a quotation system for stocks or other items, an incoming line channel over which quotations each including item selection letter signal impulses comprising an alphabetical designation of an item and digit signal impulses comprising the price portion of the quotation are received in coded time relationship, groups of letter signal storage devices, each group comprising means for storing signals representative of one of a plurality of letters comprising a plural letter item designation, groups of digit signal storage devices, distributor structure for allocating to said groups of storage devices respectively the letter signal impulses and digit signal impulses received over said channel, means controlled by the groups of letter signal storage devices for translating the combined effect of said letter signal impulses into coded digit signals corresponding to a predetermined item designation number comprising a plurality of digits, a retransmitting circuit, and means for retransmitting said item designation number and price signals as coded digit signal impulses over said retransmitting circuit.

2. In a quotation system for stocks or other items, an incoming line channel over which quotations each including item selection letter signal impulses comprising an alphabetical designation of an item and digit signal impulses comprising the range and the price portions of the quotation are received in coded time relationship, groups of letter signal storage devices, each group comprising means for storing signals representative of one of a plurality of letters comprising a plural letter item designation, groups of range and price digit signal storage devices, distributor structure for allocating to said groups of storage devices respectively the letter signal impulses and the range and price digit signal impulses received over said channel, means controlled by the groups of letter signal storage devices for translating the combined effect of the letter signals into coded digit signals corresponding to a predetermined item designation number comprising a plurality of digits, a retransmitting circuit, and means for retransmitting the item designation number, range and price signals as coded digit signal impulses over said retransmitting circuit.

3. In a quotation system for stocks or other items, an incoming line channel over which quotations each including item selection letter signal impulses comprising an alphabetical designation of an item and digit signal impulses comprising the price portion of the quotation are received in coded time relationship, groups of letter signal storage devices, each group comprising means for storing signals representative of one of a plurality of letters comprising a plural letter item designation, groups of digit signal storage devices, distributor structure for allocating to said groups of storage devices respectively the letter signal impulses and digit signal impulses received over said channel, means controlled by the groups of letter signal storage devices for translating the combined effect of said letter signals into coded digit signals corresponding to a predetermined item designation number comprising a plurality of digits, a retransmitting circuit, and means under control of the first mentioned means and said storage devices for retransmitting all of said quotation signals as coded digit signal impulses over said retransmitting circuit.

4. In a quotation system for stocks or other items, an incoming line channel over which quotations each including item selection letter signal impulses comprising an alphabetical designation of an item and digit signal impulses comprising the remaining portion of the quotation are received in coded time relationship, groups of letter signal storage devices, each group comprising means for storing signals representative of one of a plurality of letters comprising a plural letter item designation, groups of digit signal storage devices, distributor structure for allocating to said groups of storage devices respectively the letter signal impulses and digit signal impulses received over said channel, means controlled by the groups of letter signal storage devices for translating the combined effect of said letter signals into coded digit signals corresponding to a predetermined item designation number comprising a plurality of digits, a group of associated retransmitting line channels, and retransmitting distributor structure under control of said storage devices for allocating in code the various impulses of all said digit signals to different ones of said group of retransmitting line channels.

5. In a quotation system for stocks or other items, an incoming line channel over which quotations each including item selection letter signal impulses comprising an alphabetical designation of an item and digit signal impulses comprising the remaining portion of the quotation are received in coded time relationship, groups of letter signal storage devices, each group comprising means for storing signals representative of one of a plurality of letters comprising a plural letter item designation, groups of digit signal storage devices, distributor structure for allocating to said groups of storage devices respectively the letter signal impulses and digit signal impulses received over said channel, means controlled by the groups of letter signal storage devices for translating the combined effect of said letter signals into coded digit signals corresponding to a predetermined item designation number comprising a plurality of digits, a plurality of associated retransmitting line channels, and retransmitting distributor structure under control of said storage devices for allocating in code the various impulses of said digit signals to different ones of said plurality of retransmitting line channels, said retransmitting channels corresponding in number to the number of units of the digit signal code employed.

6. In a recoding and retransmitting mechanism the combination of selectively settable bars, a receiving distributor for allocating incoming impulses to control the selection of said bars, a plurality of groups of relays, circuits controlled by each bar for simultaneously energizing a relay in each group in accordance with predetermined prepared circuit connections from said bars to said relays, and means for retransmitting successively over a plurality of line channels groups of simultaneous impulses controlled respectively by the energized relays in the several groups.

7. The combination of a coded pulse receiving distributor, storage relays adapted to be energized by impulses allocated thereto by said distributor, means controlled by said storage relays for converting the coded information received into a different code, relays controlled by said means, a retransmitting distributor operable under control of said latter relays, means controlled by the receiving distributor for releasing the storage relays, means controlled by the receiving distributor for setting the retransmitting distributor in operation, and means controlled by the retransmitting distributor for releasing said second mentioned relays.

8. The combination with a line channel, groups of letter storing relays, each of said groups comprising means for storing signals representative of one of a plurality of letters comprising a plural letter designation, groups of digit storing relays, a receiving distributor for allocating item selection letter signals each comprising five unit coded pulses received over said line channel to said groups of letter storage relays and for allocating four unit coded pulses to said groups of digit storing relays, means under control of the said groups of letter storing relays for translating the combined settings of said letter storage relays into a four unit code as digit information comprising a plurality of digits, and means under control of said first mentioned means and said digit storing relays for retransmitting all of said information as a four unit code.

9. The combination with a line channel, a group of letter storing relays, a group of digit storing relays, a receiving distributor for allocating item selection letter signals each comprising five unit coded pulses received over said line channel to said group of letter storage relays and for allocating four unit coded pulses to said digit storing relays, means under control of said letter storing relays for converting said letter information into a four unit code as digit information comprising a number consisting of a plurality of digits, and means for retransmitting all of said information as a four unit code, by a succession of sets of concurrent impulses over four wires, each set of which represents an item of information received.

10. The combination with a line channel, a group of letter storing relays, preferred information storing relays, a group of digit storing relays, a receiving distributor for allocating five unit coded pulses received over said line channel to said group of letter storage relays, for allocating preferred information impulses to said preferred storing relays, and for allocating four unit coded pulses to said digit storing relays, means under the conjoint control of said letter storing relays and said preferred storing relays for converting and combining said letter and preferred information into a four unit code as digit information, and means for retransmitting all of said information as a four unit code.

11. The combination with a line channel, groups of letter storing relays, each of said groups comprising means for storing signals representative of one of a plurality of letters comprising a plural letter designation, groups of digit storing relays, a receiving distributor for allocating item selection letter signals each comprising five unit coded pulses received over said line channel to said groups of letter storage relays and for allocating four unit coded pulses to said groups of digit storing relays, means under control of the said groups of letter storing relays for translating the combined settings of said letter storage relays into a four unit code as digit information comprising a plurality of digits, means for retransmitting all of said information as a four unit code, and means under control of certain of said digit storing relays when said relays are unoperated for controlling the transmission of pulses indicative of the fact that no information has been received.

RAYMOND M. HICKS.
EVERETT R. LEROY.